US012804341B2

(12) United States Patent
Backman

(10) Patent No.: US 12,804,341 B2
(45) Date of Patent: Nov. 17, 2026

(54) DIAPHRAGM AND SPEAKER INCLUDING THE SAME

(71) Applicant: AAC Technologies Pte. Ltd., Singapore (SG)

(72) Inventor: Juha Backman, Tampere (FI)

(73) Assignee: AAC Technologies Pte. Ltd., Singapore (SG)

( * ) Notice: Subject to any disclaimer, the term of this patent is extended or adjusted under 35 U.S.C. 154(b) by 405 days.

(21) Appl. No.: 18/522,172

(22) Filed: Nov. 28, 2023

(65) Prior Publication Data

US 2025/0175753 A1 May 29, 2025

(51) Int. Cl.
*H04R 31/00* (2006.01)
*F16K 7/16* (2006.01)
*H04R 7/18* (2006.01)
*H04R 9/06* (2006.01)

(52) U.S. Cl.
CPC ............ *H04R 31/003* (2013.01); *F16K 7/16* (2013.01); *H04R 7/18* (2013.01); *H04R 9/06* (2013.01)

(58) Field of Classification Search
CPC .......... H04R 31/003; H04R 7/18; H04R 9/06; H04R 17/00; H04R 9/043; H04R 1/28; F16K 7/16
See application file for complete search history.

(56) References Cited

U.S. PATENT DOCUMENTS

| | | | | |
|---|---|---|---|---|
| 7,542,583 B2 * | 6/2009 | Funahashi | .............. | H04R 9/043 381/404 |
| 2003/0185415 A1 * | 10/2003 | Funahashi | .............. | H04R 9/043 381/407 |

FOREIGN PATENT DOCUMENTS

| | | | |
|---|---|---|---|
| EP | 1793648 B1 * | 5/2012 | ............... H04R 1/28 |

* cited by examiner

*Primary Examiner* — Angelica M McKinney
(74) *Attorney, Agent, or Firm* — Wiersch Law Group

(57) ABSTRACT

Provided is a diaphragm and a speaker. The diaphragm includes: a diaphragm body having a mounting part at an edge thereof, within which a mounting space is formed, a projection of the mounting space completely falls on the diaphragm body. An anti-roll mechanism provided in the mounting space and includes anti-roll components connected to the mounting part. Each anti-roll component includes first and second movable parts, and the first movable part is closer to the mounting part than the second movable part. One end of the first movable part is pivotally connected to the mounting part, the other end of the first movable part is pivotally connected to the second movable part, and the second movable part is capable of moving back and forth. This structure prevents rolling motion of the diaphragm body, improves its stability and reliability, and avoids noise, thereby improving acoustic performance of the speaker.

12 Claims, 6 Drawing Sheets

DIAPHRAGM AND SPEAKER INCLUDING THE SAME

TECHNICAL FIELD

The present disclosure relates to the field of electroacoustic conversion technologies and, in particular, to a diaphragm and a speaker including the diaphragm.

BACKGROUND

Unwanted movement of a radiator diaphragm, either a passive radiator or a loudspeaker, is a major cause for distortion. The challenge of miniature transducer design is that the spider structures that are very efficient in reducing the rocking motion in large size loudspeakers are difficult to manufacture, and so alternative structures are needed.

SUMMARY

An object of the present disclosure is to provide a diaphragm and a speaker including the diaphragm, so as to solve the technical problems in the related art.

In a first aspect, the present disclosure provides a diaphragm, including: a diaphragm body capable of vibrating along a first direction, the diaphragm body includes a mounting part at an edge of the diaphragm body, a mounting space is formed in the mounting part, and a projection of the mounting space in the first direction completely falls on the diaphragm body. An anti-roll mechanism provided in the mounting space, the anti-roll mechanism includes a plurality of anti-roll components connected to the mounting part. Each of the anti-roll components includes a first movable part and a second movable part arranged in sequence along a normal direction with respect to the first direction, and the first movable part is closer to the mounting part than the second movable part. One end of the first movable part is pivotally connected to the mounting part, the other end of the first movable part is pivotally connected to the second movable part, and the second movable part is capable of moving back and forth along the normal direction with respect to the first direction.

As an improvement, the anti-roll component further includes a first hinge and a second hinge. One end of the first hinge is connected to the mounting part, the other end of the first hinge is connected to the first movable part, and an extending direction of an axis of the first hinge is perpendicular to the first direction. One end of the second hinge is connected to an end of the first movable part away from the first hinge, and the other end of the second hinge is connected to the second movable part, and an extending direction of an axis of the second hinge is perpendicular to the first direction.

As an improvement, the anti-roll component further includes an elastic member and an anchoring part, the anchoring part is further away from the first movable part than the second movable part, and the elastic member is located between the second movable part and the anchoring part. One end of the elastic member abuts against an end of the second movable part away from the first movable part, and the other end of the elastic member abuts against the anchoring part.

As an improvement, the anti-roll component further includes a first pivot seat provided on the mounting part. A connecting groove is provided in the second movable part, and the connecting groove extends along the normal direction with respect to the first direction. The first movable part includes a first connecting shaft, a second connecting shaft and a third connecting shaft, the first connecting shaft is rotatably supported in the first pivot seat, opposite ends of the second connecting shaft are respectively connected to the first connecting shaft and the third connecting shaft, and the third connecting shaft is in clearance fit within the connecting groove.

As an improvement, the anti-roll mechanism includes four anti-roll components symmetrically arranged at four edges of the mounting part.

As an improvement, the anti-roll mechanism includes three anti-roll components, two of the anti-roll components are symmetrically arranged at two opposite edges of the mounting part, and the other one of the anti-roll components is disposed on the diaphragm body. An extending direction of the other anti-roll component is perpendicular to extending directions of the two anti-roll components.

In a second aspect, the present disclosure provides a speaker, including an actuator and the aforementioned diaphragm. The actuator is configured to drive the diaphragm body in the diaphragm to vibrate.

As an improvement, one end of the actuator is provided on the base, and the other end of the actuator is provided on the diaphragm body.

As an improvement, two diaphragm bodies are symmetrically arranged on opposite sides of the actuator.

As an improvement, one end of the actuator is provided on one of the diaphragm bodies, and the other end of the actuator is provided on the other one of the diaphragm bodies.

As an improvement, one end of the actuator is provided on the second movable part of one of the anti-roll components, and the other end of the actuator is provided on the second movable part of the other one of the anti-roll components.

As an improvement, a plurality of actuators are provided one-to-one corresponding to the plurality of anti-roll components, and each of the actuators is connected to an end of the second movable part away from the first movable part.

Compared with the related art, the technical solution according to the present disclosure can provide a stable support for the diaphragm body by arranging multiple anti-roll components, which effectively prevents the rolling motion of the diaphragm body, improves the stability and reliability of the diaphragm body, and avoids the appearance of noise, thereby effectively improving the acoustic performance of the speaker.

REFERENCE SIGNS

10—diaphragm body, 11—mounting part, 12—mounting space;
20—anti-roll component, 21—first movable part, 211—first connecting shaft, 212—second connecting shaft, 213—third connecting shaft, 22—second movable part, 23—first hinge, 24—second hinge, 25—elastic member, 26—first pivot seat, 27—connecting groove;
30—actuator, 31—magnetic circuit, 32—voice coil, 33—first mass block, 34—second mass block, 35—piezoelectric actuator, 36—base;
40—anchoring part;
50—suspension;
60—outer frame;
D1—first direction;
D2—second direction;
D3—third direction.

DESCRIPTION OF EMBODIMENTS

Embodiments described below with reference to the drawings are exemplary and are only used to explain the present disclosure and shall not be construed as providing ant limitation to the present disclosure.

In order to better explain the structure of the diaphragm, a first direction D1, a second direction D2 and a third direction D3 are used. The vibration direction of the diaphragm body 10 in the diaphragm is defined as the first direction D1. The second direction D2 and the third direction D3 are both perpendicular to the first direction D1, and the second direction D2 is perpendicular to the third direction D3. The first direction D1, the second direction D2 and the third direction D3 together form the three spatial axes of the coordinate system.

Referring to FIGS. 1 to 7, an embodiment of the present disclosure provides a diaphragm, the diaphragm includes a diaphragm body 10 and an anti-shake mechanism.

The diaphragm body 10 can vibrate along the first direction D1. The diaphragm body 10 is provided with a mounting part 11. The mounting part 11 can be either a part of the diaphragm body 10 or arranged on a frame at the edge of the diaphragm body 10. It is preferred that the mounting part 11 is arranged on a frame structure at the edge of the diaphragm body 10 to improve the structural strength. The mounting part 11 protrudes from the surface of the diaphragm body 10 in the first direction D1 to form a mounting space 12. A projection of the mounting space 12 in the first direction D1 completely falls on the diaphragm body 10. The mounting space 12 is configured to accommodate an anti-roll mechanism, thereby reducing the space occupied by the diaphragm, which is conducive to further reducing the size of the speaker.

The anti-roll mechanism includes a plurality of anti-roll components 20. The anti-roll components 20 are located in the mounting space 12, and the anti-roll components 20 are all connected to the mounting part 11. In embodiments of the present disclosure, the diaphragm body 10 has a square or rectangular structure. The mounting part 11 surrounding the edge of the diaphragm body 10 also has a square or rectangular frame structure.

Figure 6:
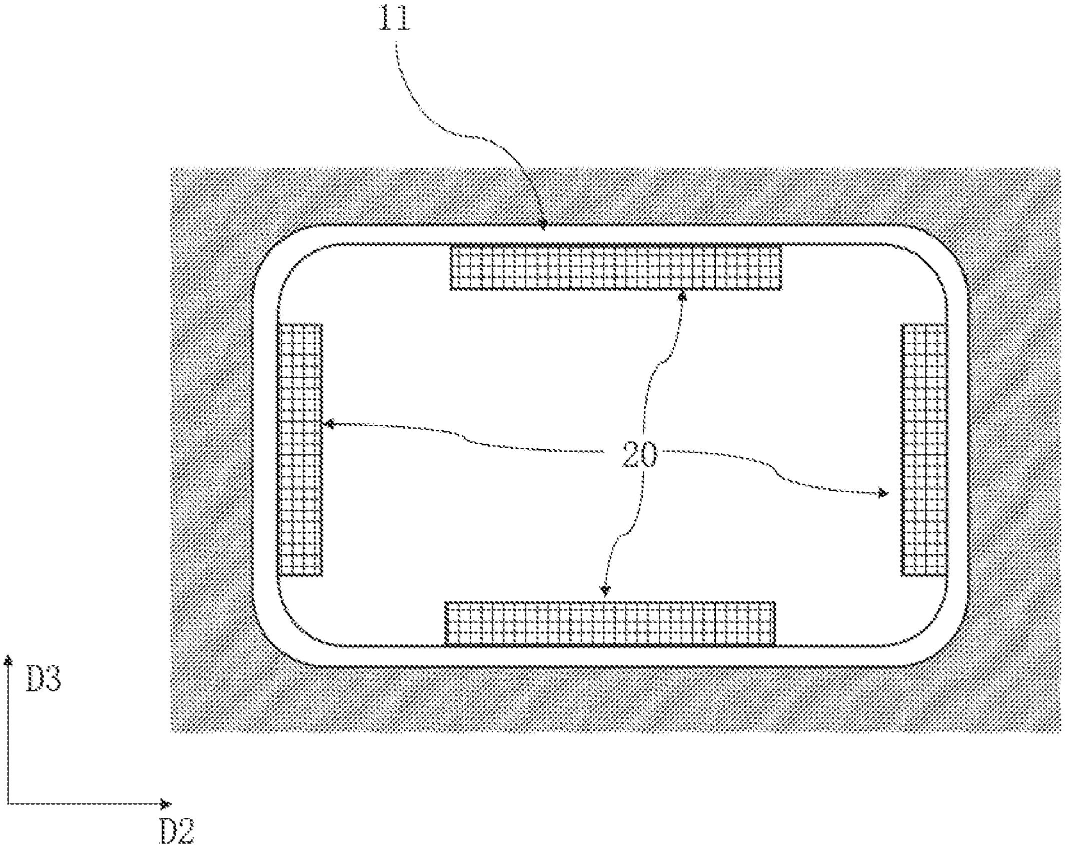
FIG. 6 is a schematic diagram of a layout of an anti-roll mechanism according to an embodiment of the present disclosure.

In an embodiment, as shown in FIG. 6, the anti-roll mechanism includes four anti-roll components 20. The four anti-roll components 20 are symmetrically arranged in two pairs at the four edges of the mounting part 11. The four evenly distributed anti-roll components 20 can achieve the optimal effect of amplitude adjustment, better control of the rolling motion in all directions, and thereby further improving the acoustic performance of the speaker.

Figure 7:
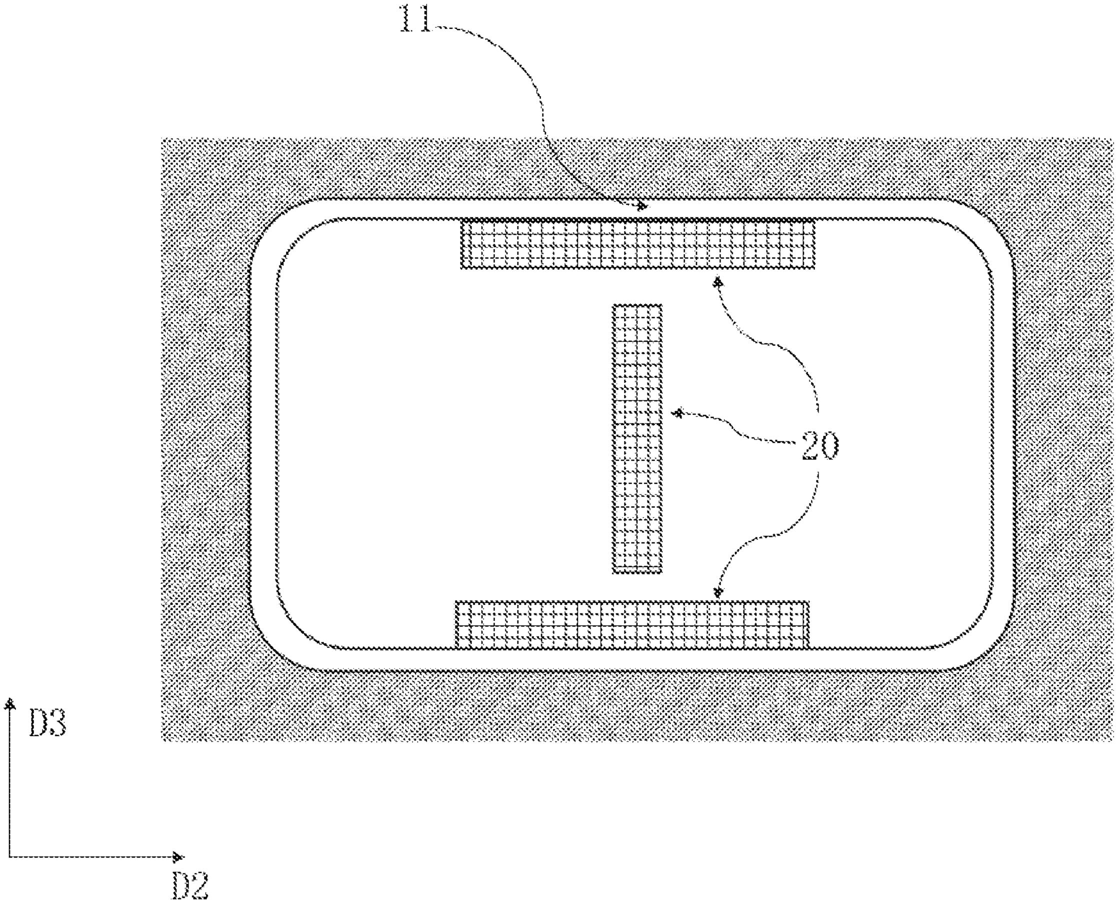
FIG. 7 is a schematic diagram of another layout of the anti-roll mechanism according to an embodiment of the present disclosure.

In an embodiment, as shown in FIG. 7, the anti-roll mechanism includes three anti-roll components 20, two of which are symmetrically arranged on two opposite edges of the mounting part 11, and rest one anti-roll component 20 is disposed on the diaphragm body 10. The extension direction of this one anti-roll component 20 is perpendicular to the extension directions of the pair of anti-roll components 20.

Those skilled in the art can understand that the number and distribution of the anti-roll components 20 in the anti-roll mechanism can be determined according to the actual shape of the diaphragm body 10 and the requirements on anti-roll performance, which are not limited here.

In embodiments of the present disclosure, the anti-roll component 20 includes a first movable part 21 and a second movable part 22. The first movable part 21 and the second movable part 22 are arranged in sequence along the normal direction with respect to the first direction D1. The first movable part 21 is closer to the mounting part 11 than the second movable part 22. One end of the first movable part 21 is pivotally connected to the mounting part 11. An extension direction of the axis of the pivot joint is parallel to the second direction D2 or the third direction D3, so as to suppress rolling of the diaphragm body 10. The other end of the first movable part 21 is pivotally connected to the second movable part 22. An extension direction of this pivot joint is parallel to the second direction D2 or the third direction D3, while the second movable part 22 can move back and forth along the normal direction with respect to the first direction D1 (i.e., the second direction D2 or the third direction D3) to suppress the horizontal movement of the diaphragm body 10.

By arranging multiple anti-roll components 20, the diaphragm body 10 can be stably supported, which effectively prevents the rolling movement of the diaphragm body 10, improves the stability and reliability of the diaphragm body 10, and avoids noise, thereby effectively improves the acoustic performance of the speaker.

Figure 1:
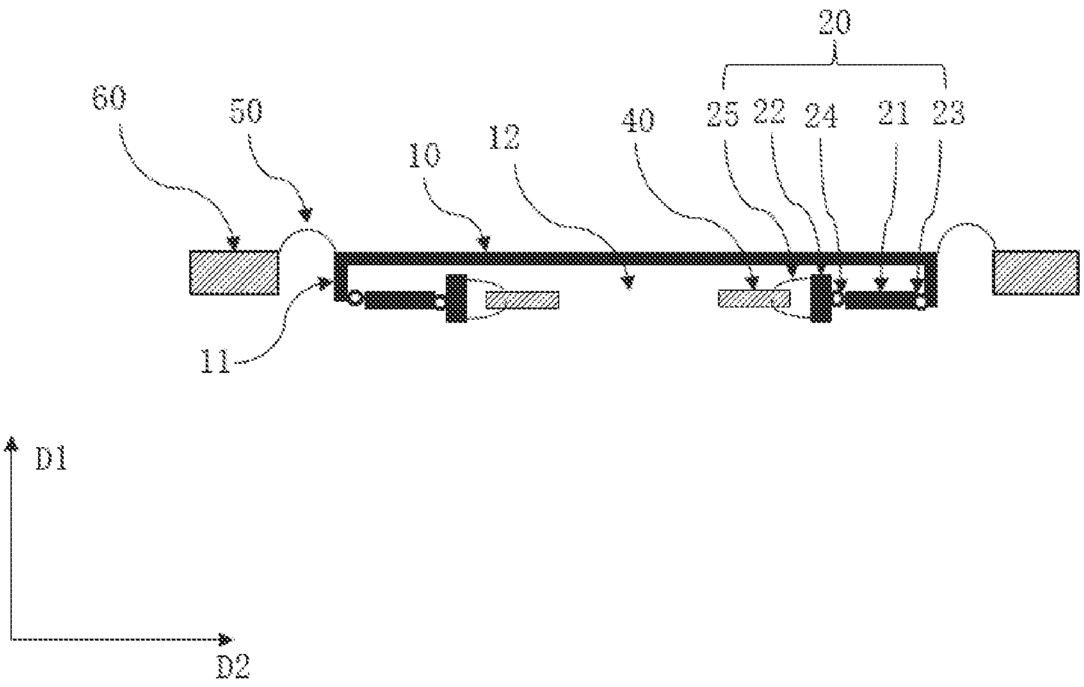
FIG. 1 is a schematic structural diagram of a diaphragm with a first structure according to an embodiment of the present disclosure.
Figure 2:
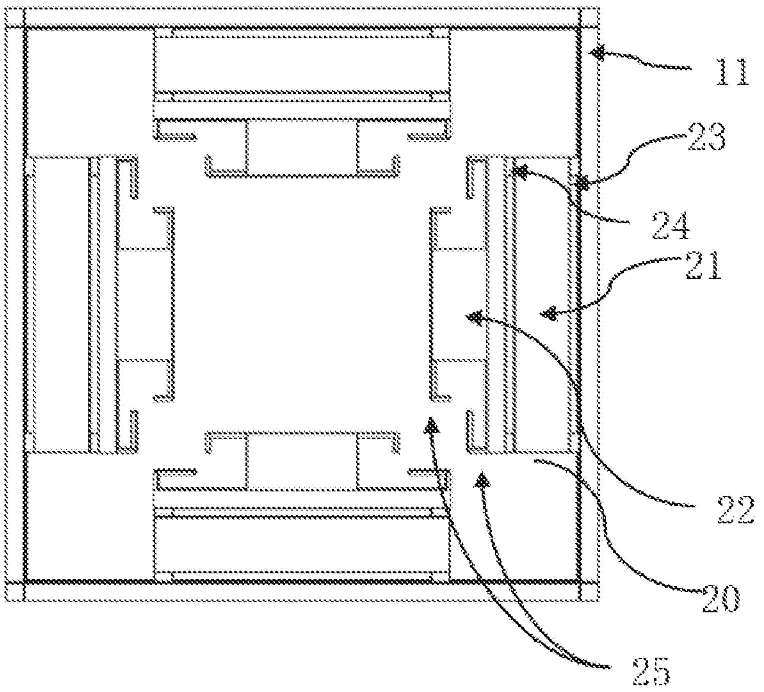
FIG. 2 is a top view of the diaphragm with the first structure according to an embodiment of the present disclosure.
Figure 3:
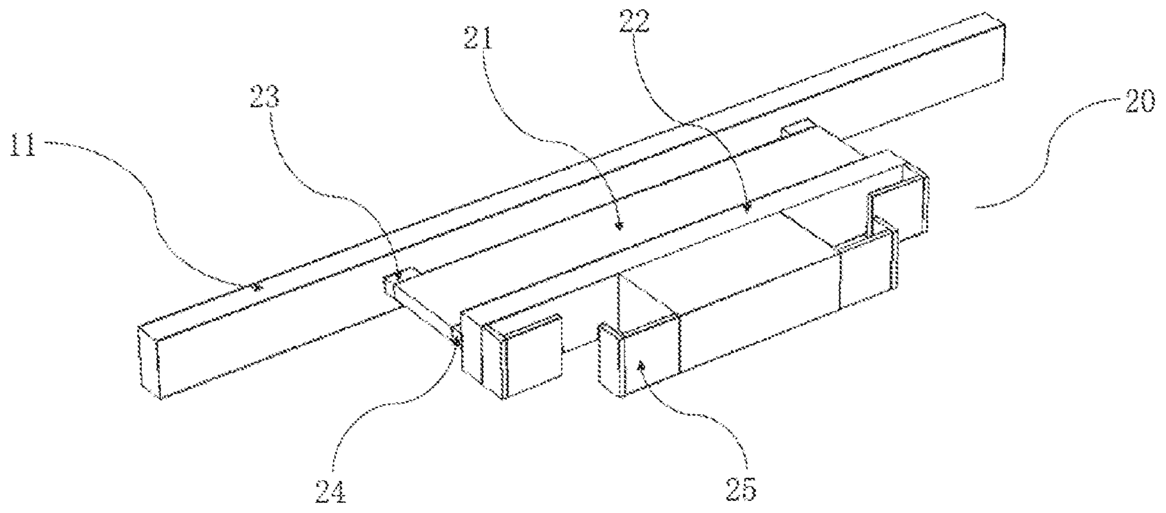
FIG. 3 is a schematic structural diagram of an anti-roll component of the diaphragm with the first structure according to an embodiment of the present disclosure.

In an embodiment, as shown in FIGS. 1 to 3, the anti-roll component 20 further includes a first hinge 23 and a second hinge 24.

One end of the first hinge 23 is connected to the mounting part 11, and the other end of the first hinge 23 is connected to the first movable part 21. The extension direction of an axis of the first hinge 23 is perpendicular to the first direction D1, which extends along the second direction D2 or the third direction D3 to suppress rolling of the diaphragm body 10.

The structure of the first hinge 23 can refer to the conventional hinge structure in the related art, which will not be described in detail here. The number of the first hinge 23 is preferably multiple, and the multiple first hinges 23 are sequentially distributed along the second direction D2 or the third direction D3 to improve the stability and reliability of the relative movement between the first movable part 21 and the mounting part 11.

One end of the second hinge 24 is connected to the second end of the first movable part 21, and the other end of the second hinge 24 is connected to an end of the second movable part 22 away from the first movable part 21. The extension direction of the axis of the second hinge 24 is perpendicular to the first direction D1, which extends along the second direction D2 or the third direction D3, thereby further suppressing rolling of the diaphragm body 10. The structure of the second hinge 24 can refer to the conventional hinge structure in the related art, which will not be described in detail here. The number of the second hinges 24 is preferably multiple, and the multiple second hinges 24 are sequentially distributed along the second direction D2 or the third direction D3 to improve the stability and reliability of the relative movement between the first movable part 21 and the second movable part 21.

Referring to FIG. 3, the anti-roll component 20 further includes an elastic member 25 and an anchoring part 40. The anchoring part 40 is further away from the first movable part 21 than the second movable part 22. The elastic member 25 is located between the second movable part 22 and the anchoring part 40. The elastic member 25 provides a certain elastic compression space for the second movable part 22 to move along the second direction D2 or the third direction D3. The elastic member 25 is preferably a leaf spring. One end of the elastic member 25 abuts against an end of the second movable part 22 away from the first movable part 21, and the other end of the elastic member 25 abuts against the anchoring part 40. The anchoring part 40 is not movable. When the second movable part 22 is subjected to an external force, the second movable part 22 moves certain extent along the second direction D2 or the third direction D3, thereby compressing the elastic member 25. The elastic member 25 accumulates elastic restoring force, and after releasing the external force acted on the second movable part 22, the elastic restoring force of the elastic member 25 is released, and the second movable part 22 can return to the initial position.

Those skilled in the art can understand that the second movable part 22 can also be slidably provided in the bearing to achieve horizontal movement, which is more suitable for systems having larger dimension than the micro-speaker, which is not elaborated here.

Figure 4:
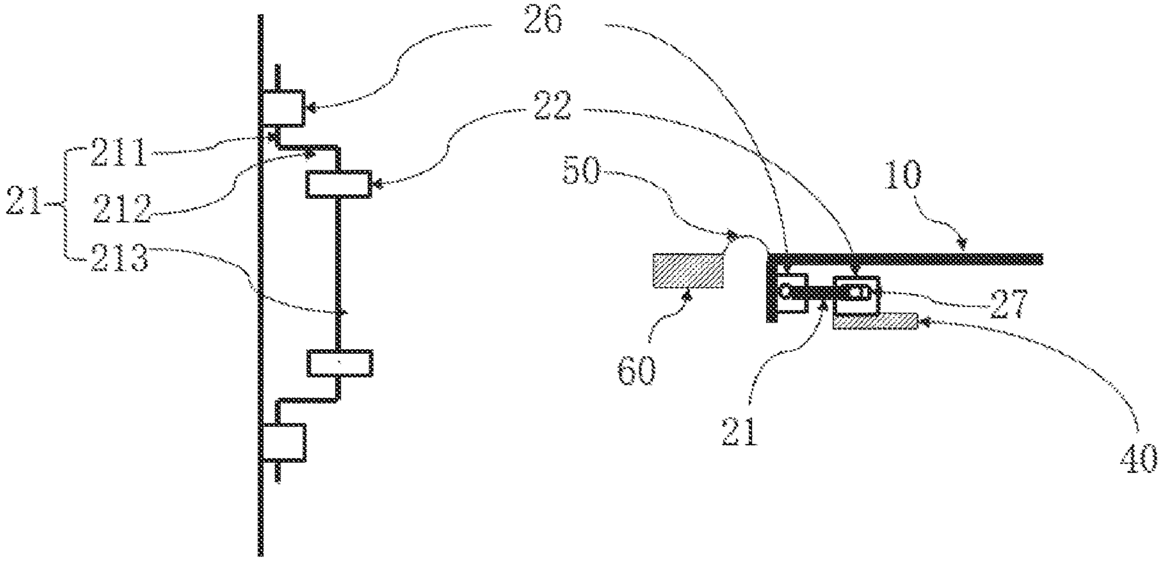
FIG. 4 is a schematic structural diagram of a diaphragm with a second structure according to an embodiment of the present disclosure.

In an embodiment that can be applied to larger-size speakers or resonators, as shown in FIG. 4, the anti-roll component 20 further includes a first pivot seat 26 provided on the mounting part 11. The first pivot seat 26 is equipped with a bearing or a sliding sleeve.

The second movable part 22 is provided with a connecting groove 27. The connecting groove 27 is a strip groove. The connecting groove 27 extends along the normal direction of the first direction D1 to provide guidance and limiting functions.

The first movable part 21 includes a first connecting shaft 211, a second connecting shaft 212 and a third connecting shaft 213, which are preferably integrally formed to improve the overall strength. Two first connecting shafts 211 and two second connecting shafts 212 are symmetrically provided on opposite sides of the third connecting shaft 213. The first connecting shafts 211 are rotatably supported in the first pivot seat 26, and the opposite ends of the second connecting shaft 212 are respectively connected to the first connecting shafts 211 and the third connecting shaft 213. The third connecting shaft 213 is in clearance fit within the connecting groove 27.

Figure 5:
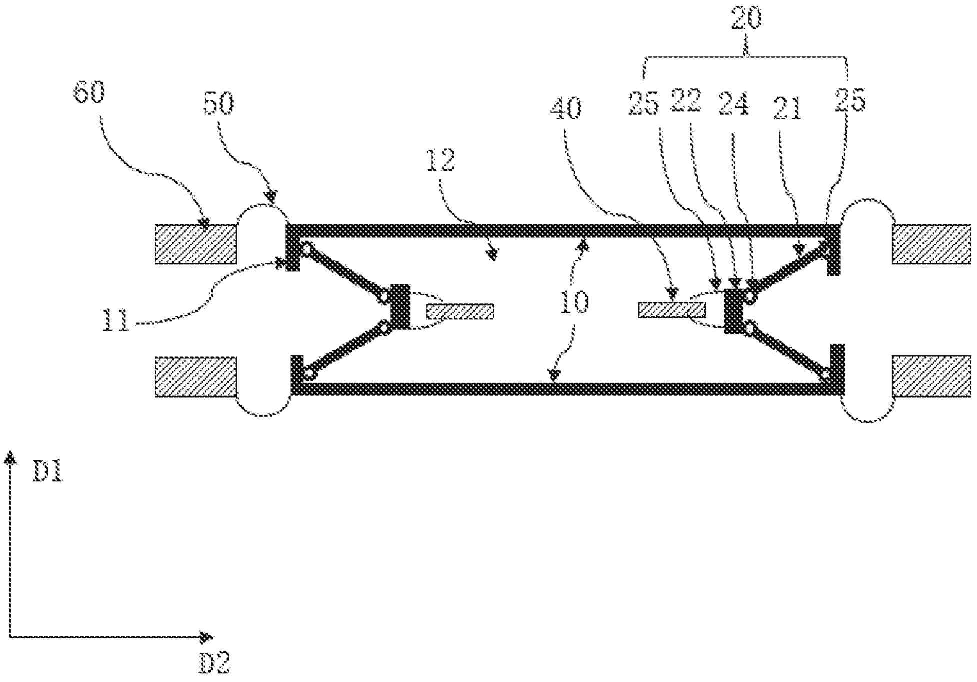
FIG. 5 is a schematic structural diagram of a diaphragm with a third structure according to an embodiment of the present disclosure.

In an embodiment, as shown in FIG. 5, there are two diaphragm bodies 10. This structure also allows movement of both sides of the diaphragm in a similar manner, thereby eliminating recoil force while preventing asymmetric motion caused by possible changes in surrounding parameters due to manufacturing tolerances, temperature differences, etc. The diaphragm bodies 10 are symmetrically located on opposite sides of the anti-roll mechanism, and each anti-roll component 20 is provided with two first movable parts 21 and two second movable parts 22. The two first movable parts 21 are symmetrically arranged along the second direction D2 or the third direction D3. The two first movable parts 21 respectively correspond to one diaphragm body 10. One end of the first movable part 21 is hinged to the mounting part 11, the other end of the first movable part 21 is hinged to the second movable part 22. The two first movable parts 21 share one second movable part 22, thereby saving space occupied by the diaphragm and thus improving space utilization. A preset included angle is formed between the two first movable parts 21. This preset included angle can be determined according to actual needs, which is not limited here.

Based on the diaphragm provided in the above embodiments, the present disclosure further provides a speaker, including an actuator 30 and the aforementioned diaphragm. The diaphragm is circumferentially connected with a suspension 50, and the part of the suspension 50 away from the diaphragm is connected to the outer frame 60. The suspension 50 and the diaphragm are separate from each other or integrated as a whole, which is not limited here. The actuator 30 includes a fixed end and a driving end. The driving end is configured to drive the diaphragm body 10 in the diaphragm to vibrate, the actuator 30 can be dynamic (a movable coil), electromagnetic (movable armature or magnet), piezoelectric and the like, to drive the diaphragm body 10 to vibrate. The internal anti-roll mechanism in the diaphragm can form a stable support for the diaphragm body 10, which effectively prevents rolling motion of the diaphragm body 10, improves the stability and reliability of the diaphragm body 10, avoids the occurrence of noise, and thereby effectively improving the acoustic performance of the speaker.

Figure 8:
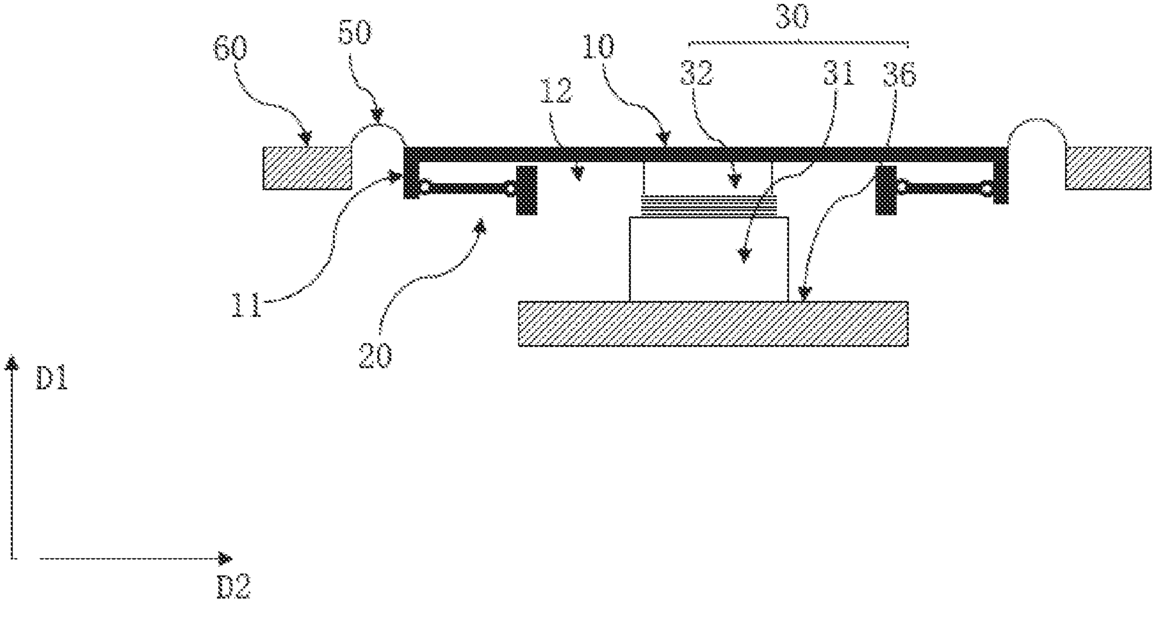
FIG. 8 is a schematic structural diagram of a speaker with a first structure according to an embodiment of the present disclosure.

In an embodiment, the fixed end of the actuator 30 is provided on the base 36, and the driving end of the actuator 30 is provided on the diaphragm body 10. As shown in FIG. 8, the actuator 30 includes a magnetic circuit 31 and a voice coil 32. The voice coil 32 is provided on the diaphragm body 10. The magnetic circuit 31 is provided on the base 36 and is opposite to the voice coil 32. When the speaker is in operation, the voice coil 32 is driven by an external driving signal to induce a variable magnetic field, and an interaction force is generated between the variable magnetic field and the constant magnetic field of the magnetic circuit 31, thereby causing the diaphragm body 10 to vibrate and produce sound.

Those skilled in the art can understand that the actuator 30 can also be a piezoelectric actuator 35, including a metal substrate and a pair of piezoelectric ceramic sheets attached to both sides of the metal substrate. The piezoelectric ceramic sheets are connected to the diaphragm body, and the piezoelectric ceramic sheets have opposite polarization directions, thereby causing one of the piezoelectric ceramic sheets to expand and vibrate, and causing the other piezoelectric ceramic sheet to contract and vibrate, thereby generating vibration. The vibration of the piezoelectric ceramic sheets drive the diaphragm body 10 to vibrate and produce sound.

Figure 9:
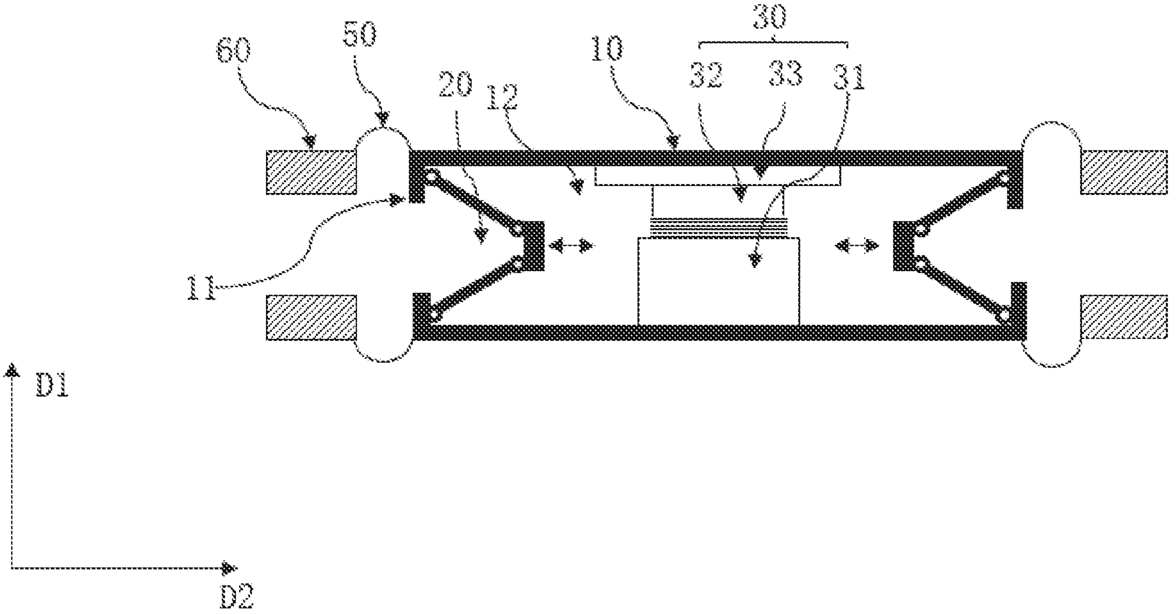
FIG. 9 is a schematic structural diagram of a speaker with a second structure according to an embodiment of the present disclosure.

In an embodiment, as shown in FIG. 9, there are two diaphragm bodies 10. The two diaphragm bodies 10 are symmetrically arranged on opposite sides of the anti-roll mechanism. This structure also allows movement of both sides of the diaphragm in a similar manner, thereby eliminating recoil force while preventing asymmetric motion caused by possible changes in surrounding parameters due to manufacturing tolerances, temperature differences, etc.

The fixed end of the actuator 30 is provided on one of the diaphragm bodies 10, and the driving end of the actuator 30 is provided on the other diaphragm body 10. The actuator 30 includes a magnetic circuit 31, a voice coil 32 and a first mass block 33. The voice coil 32 and the first mass block 33 are both arranged on one of the diaphragm bodies 10. The magnetic circuit 31 is arranged on the other diaphragm body 10 and is opposite to the voice coil 32. By providing the first mass block 33, the effective movable masses on both sides are symmetrical, thereby further eliminating recoil force. Since the movable mass of this structure is inevitably relatively heavy, this structure is most suitable for subwoofer speakers and other subwoofer applications. This embodiment is especially beneficial in that, the symmetrical diaphragm bodies 10 will also reduce the system response to external mechanical forces, making this structure well suited for high vibration environments, such as automotive use.

Figure 10:
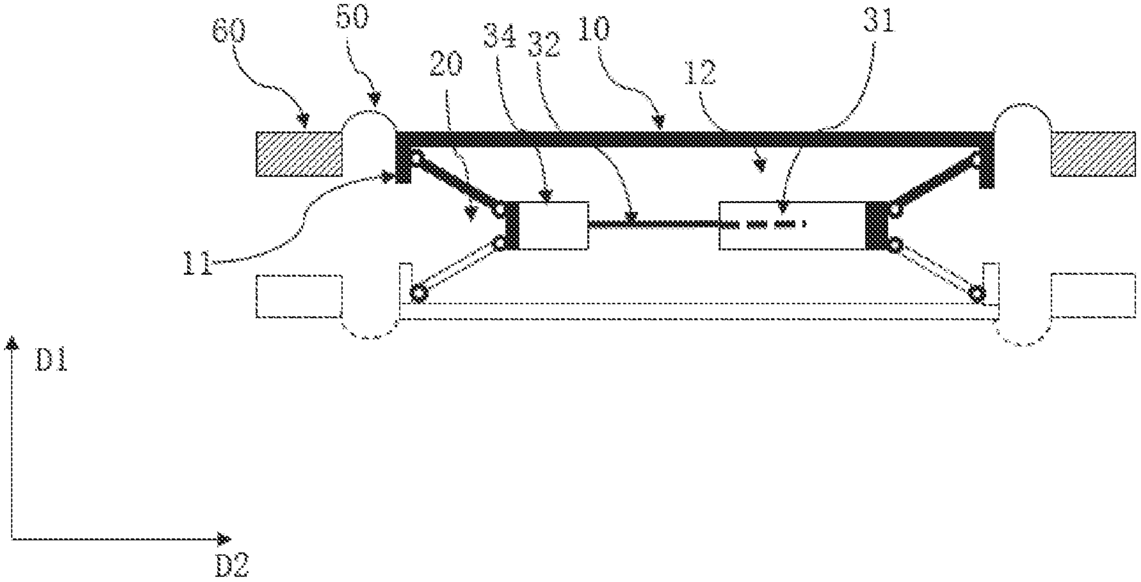
FIG. 10 is a schematic structural diagram of a speaker with a third structure according to an embodiment of the present disclosure.

In an embodiment, the fixed end of the actuator 30 is provided on the second movable part 22 of one of the anti-roll components 20, and the driving end of the actuator 30 is provided on the second movable part 22 of the other anti-roll component 20. As shown in FIG. 10, the actuator 30 includes a magnetic circuit 31, a voice coil 32 and a second mass block 34. The voice coil 32 and the second mass block 34 are both located on the second movable part 22 of one of the anti-roll components 20. By providing the second movable part 22, the effective movable masses on both sides are symmetrical, thereby further eliminating recoil force. The magnetic circuit 31 is provided on the second movable portion 22 of the other anti-roll component 20 and is opposite to the voice coil 32.

The voice coil 32 is driven by an external driving signal and correspondingly induces a variable magnetic field. An interaction force is generated between the variable magnetic field and the constant magnetic field of the magnetic circuit 31, so that the force sequentially passes through the second movable part 22, the first movable part 21 and the mounting part 11, and is transmitted to the diaphragm body 10, thereby causing the diaphragm body 10 to vibrate and produce sound.

In this embodiment, two diaphragm bodies 10 may also be provided, and the two diaphragm bodies 10 are symmetrically arranged on opposite sides of the anti-roll mechanism, which is not elaborated here.

Those skilled in the art can understand that the actuator 30 can also be a piezoelectric actuator 35, including a metal substrate and a pair of piezoelectric ceramic sheets attached to both sides of the metal substrate. One of the piezoelectric ceramic sheets are connected to the one of the second movable part 22, and the other piezoelectric ceramic sheet is connected to the other movable part. The piezoelectric ceramic sheets have opposite polarization directions, thereby causing one of the piezoelectric ceramic sheets to expand and vibrate, and causing the other piezoelectric ceramic sheet to contract and vibrate, thereby generating vibration. The vibration of the piezoelectric ceramic sheets drive the diaphragm body 10 to vibrate and produce sound.

Figure 11:
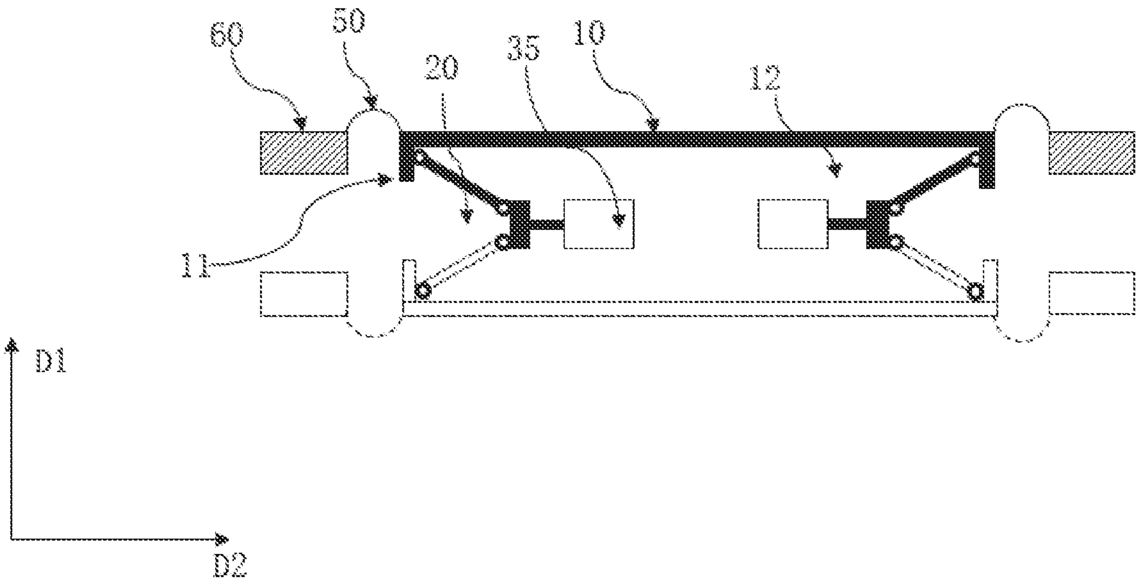
FIG. 11 is a schematic structural diagram of a speaker with a fourth structure according to an embodiment of the present disclosure.

In an embodiment, as shown in FIG. 11, there are multiple actuators 30, and the multiple actuators 30 correspond to the multiple anti-roll assemblies 20 in one-to-one correspondence. The driving end of the actuator 30 is connected to one end of the second movable part 22 away from the first movable part 21. The actuator 30 is a piezoelectric actuator 35 or an electromagnetic actuator. In this embodiment, two diaphragm bodies 10 may also be provided, and the two diaphragm bodies 10 are symmetrically arranged on opposite sides of the anti-roll mechanism, which is not elaborated here.

The structure, features and effects of the present disclosure have been described in detail based on the embodiments shown in the drawings. The above descriptions are only preferred embodiments of the present disclosure. However, the scope of the present disclosure is not limited by the drawings. Any changes made to the concept of the present disclosure, or modifications to equivalent embodiments with equivalent changes, shall be within the protection scope of the present disclosure as long as they do not exceed the spirit and scope covered by the description and drawings.

What is claimed is:

1. A diaphragm, comprising:

a diaphragm body capable of vibrating along a first direction, wherein the diaphragm body includes a mounting part at an edge of the diaphragm body, a mounting space is formed in the mounting part, and a projection of the mounting space in the first direction completely falls on the diaphragm body; and an anti-roll mechanism provided in the mounting space, wherein the anti-roll mechanism includes a plurality of anti-roll components connected to the mounting part, each of the anti-roll components includes a first movable part and a second movable part arranged in sequence along a normal direction with respect to the first direction, and the first movable part is closer to the mounting part than the second movable part, one end of the first movable part is pivotally connected to the mounting part, the other end of the first movable part is pivotally connected to the second movable part, and the second movable part is capable of moving back and forth along the normal direction with respect to the first direction.

2. The diaphragm according to claim 1, wherein the anti-roll component further includes a first hinge and a second hinge, one end of the first hinge is connected to the mounting part, the other end of the first hinge is connected to the first movable part, and an extending direction of an axis of the first hinge is perpendicular to the first direction, and one end of the second hinge is connected to an end of the first movable part away from the first hinge, and the other end of the second hinge is connected to the second movable part, and an extending direction of an axis of the second hinge is perpendicular to the first direction.

3. The diaphragm according to claim 2, wherein the anti-roll component further includes an elastic member and an anchoring part, the anchoring part is further away from the first movable part than the second movable part, the elastic member is located between the second movable part and the anchoring part, one end of the elastic member abuts against an end of the second movable part away from the first movable part, and the other end of the elastic member abuts against the anchoring part.

4. The diaphragm according to claim 1, wherein the anti-roll component further includes a first pivot seat provided on the mounting part, a connecting groove is provided in the second movable part, and the connecting groove extends along the normal direction with respect to the first direction, the first movable part includes a first connecting shaft, a second connecting shaft and a third connecting shaft, the first connecting shaft is rotatably supported in the first pivot seat, opposite ends of the second connecting shaft are respectively connected to the first connecting shaft and the third connecting shaft, and the third connecting shaft is in clearance fit within the connecting groove.

5. The diaphragm according to claim 1, wherein the anti-roll mechanism includes four anti-roll components symmetrically arranged at four edges of the mounting part.

6. The diaphragm according to claim 1, wherein the anti-roll mechanism includes three anti-roll components, two of the anti-roll components are symmetrically arranged at two opposite edges of the mounting part, and the other one of the anti-roll components is disposed on the diaphragm body, wherein an extending direction of the other anti-roll component is perpendicular to extending directions of the two anti-roll components.

7. A speaker, comprising an actuator and the diaphragm according to claim 1, wherein the actuator is configured to drive the diaphragm body in the diaphragm to vibrate.

8. The speaker according to claim 7, wherein one end of the actuator is provided on the base, and the other end of the actuator is provided on the diaphragm body.

9. The speaker according to claim 7, wherein two diaphragm bodies are symmetrically arranged on opposite sides of the actuator.

10. The speaker according to claim 9, wherein one end of the actuator is provided on one of the diaphragm bodies, and the other end of the actuator is provided on the other one of the diaphragm bodies.

11. The speaker according to claim 7, wherein one end of the actuator is provided on the second movable part of one of the anti-roll components, and the other end of the actuator is provided on the second movable part of the other one of the anti-roll components.

12. The speaker according to claim 7, wherein a plurality of actuators are provided one-to-one corresponding to the plurality of anti-roll components, and each of the actuators is connected to an end of the second movable part away from the first movable part.

* * * * *